UNITED STATES PATENT OFFICE.

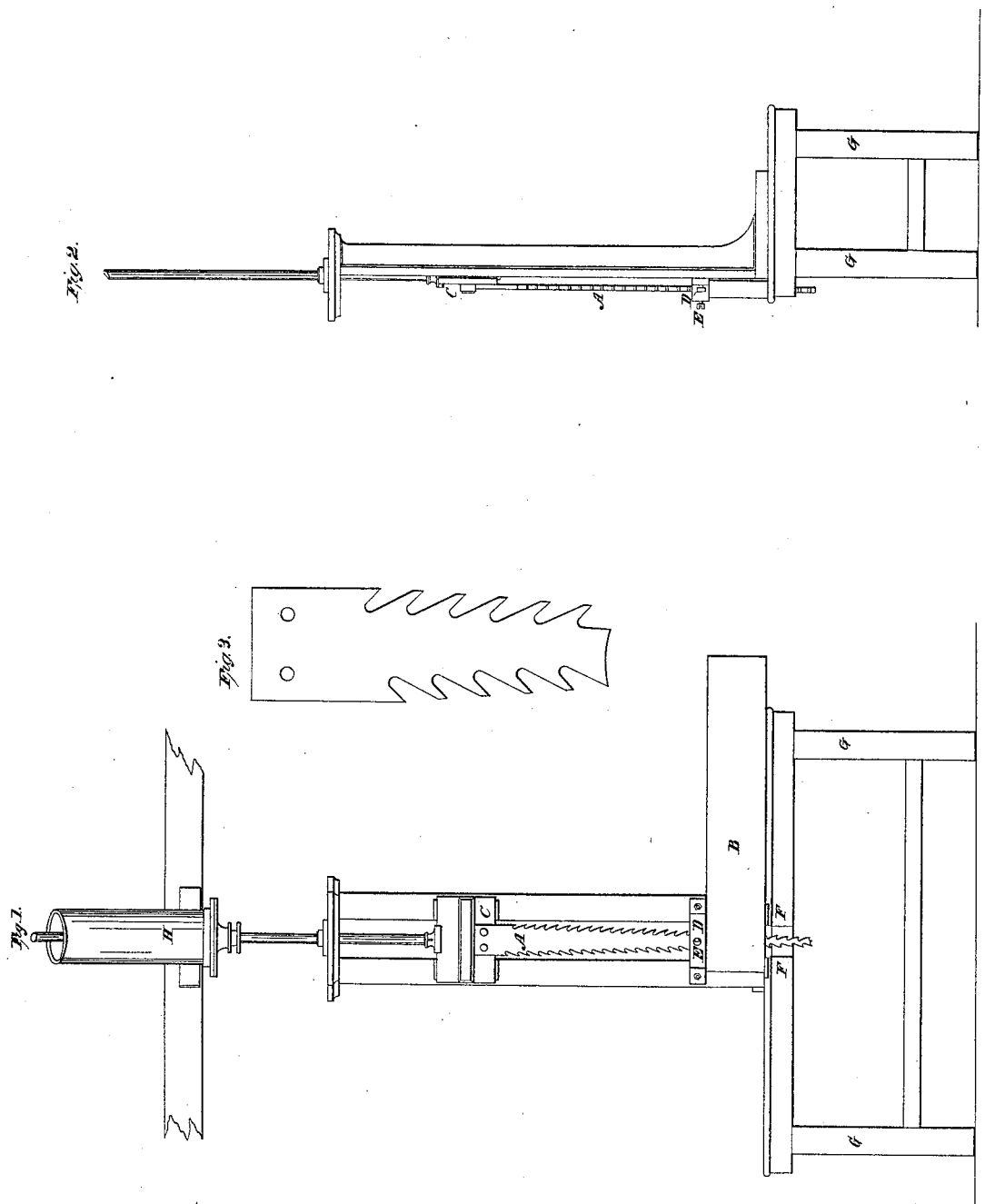

HAZARD KNOWLES, OF NEW YORK, N. Y.

MORTISING-TOOL.

Specification of Letters Patent No. 14,160, dated January 29, 1856.

*To all whom it may concern:*

Be it known that I, HAZARD KNOWLES, of New York, in the State of New York, have invented a new and useful Improvement in Mortising-Chisels; and I do declare the following to be a full, clear, and exact description of the same, reference being had to the accompanying drawing.

In mortising chisels heretofore used for cutting mortises in wood, only one single cutting edge has been employed, whose operation was to cut as much as the strength of the material of the tool and the character of the wood to be cut would permit, at one single stroke, and then to return and repeat the cut until the desired quantity of wood had been removed to produce the requisite mortise. This single edge has been aided somewhat by using it in combination with a running auger working inside of a square cutter, and removing the wood within its reach by boring, leaving only the square corners to the chisel; but this tool makes only a square mortise, and is limited in its capacity to do that by certain limits of size. When used to make long mortises it repeats its operation until the number of squares equals the entire size to be cut. Running cutters have also been employed to cut mortises, having a series of tools upon an endless chain, sinking gradually into the wood; but these in practice have been found inferior to reciprocating cutters.

My improvement consists in combining in one single chisel, a number of cutting edges, each one of which cuts only as much as steel edges ought to cut, and which are so arranged as to follow each other in immediate succession gradually widening the mortise until the desired width has been obtained. By this principle a chisel may be made to cut a mortise of any size at a single stroke, while at the same time no one of the cutting edges is over-strained and the wood is not crushed any more than it would be by a single cut of the old fashioned chisel.

In the accompanying drawing Figure 1 is a front elevation of one of my chisels, combined with a guide frame and steam cylinder for working it by steam. Fig. 2 is a side elevation of the same. Fig. 3 is a small section of the chisel.

The same letters refer to the same parts in all.

A, is the chisel, which is made of a solid plate of steel, as thick as the width of the mortise, and which is gradually tapered from its point to its base having its opposite sides similar to each other. The separate cutting edges on these opposite diverging sides, are made by cutting gullets into the plate at an angle of about forty five degrees with the diverging edges of the tool, deep enough to contain and carry through the mortise, the material which the edges above them may cut from the wood. The diverging line which intervenes between two gullets gives the best shape for the cutting edges, because it prevents them from anchoring into the wood, and it enables the operator to sharpen them by the application of an oil stone to all at once, but the angle of that line with the gullet may be altered without changing the nature of the operation.

B is the plank through which the mortise is being made, which rests upon the table G, and is held in place by the guide D.

F, F, are metal jaws set as wide apart as the length of the mortise to be cut, so that when the chisel has been driven through the wood, it just touches each of them, thereby preventing the mortise from splitting out on the lower side.

E, is a guide screw whose point bears against the face of the chisel to prevent its vibration. Another one corresponding with this one is on the opposite side of the chisel. A groove may be planed into the faces of the chisel for these guide screws to run in, thereby guiding it both ways.

C, is a cross lead sliding in ways and thereby accurately directing the chisel.

H, is a steam cylinder in which a piston travels which drives the chisel through the wood.

The manner of operating the chisel is this: A hole is first bored in the plank in the center of the intended mortise, and it is then placed on the table so that the sole exactly coincides with the central axis of the chisel, and is then held by any of the known means. The chisel is then driven down by the steam or by any other power, and as its lower extremity enters the hole the first pair of cutting edges square it and the chips they make fall through. The next pair cut the mortise as much wider as their width exceeds that of the first pair, and these chips are carried down in the gullets below them and each pair in succession cut their proportion until all have passed through, when the mortise will be perfect and parallel throughout. If the tool is stopped short of the entire stroke, the mortise will correspond generally in shape with the chisel but will not have its opposite sides smooth as it will when the chisel goes through. The increase of the width of the chisel between each pair of cutters on the average should be about one sixteenth of an inch, but this may be varied to accommodate the depth of the mortise and the quality of the work. The length of the chisel, also varies with the length and depth of the mortise to be cut, and the distance between the cutting edges should be not less than three eighths of an inch apart, but that may be varied to suit different cases.

It will be apparent that this chisel may be used as a hand tool and driven by a mallet as other hisels are, and that in place of being made solid, the opposite diverging sides may be hinged together at the point and set at any angle with each other; and that one side of the chisel may be left plane and vertical and the cutters placed on the other; and that triangular or any other shaped chisels may be made by applying to their many sides the series of cutters as described, and that the angle of the cutting edges with the axis of the chisel, may be varied without altering the nature of the invention.

Instead of using the ordinary auger for boring the holes in the center of the intended mortises, an auger may be attached to the point or narrow end of the chisel and by attaching the chisel to a cylindrical slide and revolving the same, the hole can be first bored, and then the chisel forced through, thereby combining the chisel and auger in one instrument.

I am aware that saws for slitting timber or cutting logs into planks or boards have been made with chisel edges, as they are termed, to have a cutting instead of a scraping action on the wood, and I am also aware that saws for sawing lumber have been made with teeth on both edges to enable the saw to cut alternately in opposite directions, and I am also aware that the teeth of saws have been arranged on the edge of the saw in a line oblique to the line of motion of the saw gate, so as to effect the sawing at each down stroke of the saw while the log or timber is at rest, that the feeding motion may be given to the log, as the saw is ascending, instead of giving such feeding motion as the saw descends; but none of the saws above referred to are suitable, or could be used for, mortising or performing any operation analogous to that of mortising, which is that of giving the required form to wood by cutting out the entire substance within the boundaries of the form required while the operation of sawing gives the form desired by slitting or separating the material in two parts, and therefore I do not wish to be understood as making claim broadly to an instrument with teeth upon one or both edges, nor to the making of an instrument with teeth along the edge or edges on a line inclined to the line of motion of such instrument; but What I do claim as my invention and desire to secure by Letters Patent, is—

1. Combining in one instrument a series of chisels of the width required to give the desired form to the wood to be cut, when the said chisels are arranged in succession on a line oblique to the line of motion of the entire series, and with gullets interposed to receive and hold the wood cut by each chisel until it passes through the thickness of the material to be cut, substantially as described, by which combination and arrangement the desired form is given at one operation, by the breadth of the chisels and by the inclination of the series to the line of motion of the cutting edge, as set forth.

2. And I also claim the employment of an instrument composed of the combined series of chisels arranged substantially as specified, in combination with the jaws on which the wood to be mortised is placed, which jaws are to be so set or adjusted relatively to the line of motion of the said instrument, and the inclination of the series of chisels as to sustain the under surface of the wood outside of the form intended to be cut, and to act as resisting shears in conjunction with the chisels which finish the cutting of the desired form, substantially as described.

HAZARD KNOWLES.

Witnesses:
HENRY B. RENWICK,
GEO. D. SERGEANT.